(12) United States Patent
Hedrich

(10) Patent No.: US 6,473,230 B2
(45) Date of Patent: Oct. 29, 2002

(54) MICROSCOPE

(75) Inventor: Roland Hedrich, Ehringshausen (DE)

(73) Assignee: Leica Microsystems Wetzlar GmbH, Wetzlar (DE)

(*) Notice: Subject to any disclaimer, the term of this patent is extended or adjusted under 35 U.S.C. 154(b) by 0 days.

(21) Appl. No.: 10/004,710

(22) Filed: Dec. 4, 2001

(65) Prior Publication Data

US 2002/0135870 A1 Sep. 26, 2002

(30) Foreign Application Priority Data

Dec. 11, 2000 (DE) .......................................... 100 61 627
Nov. 7, 2001 (DE) .......................................... 101 54 240

(51) Int. Cl.⁷ .......................... G02B 21/06; G02B 21/00
(52) U.S. Cl. ........................ 359/385; 359/368; 359/381
(58) Field of Search .............................. 359/363, 368, 359/379–389

(56) References Cited

U.S. PATENT DOCUMENTS

| 5,777,783 A | * | 7/1998 | Endou et al. ............... 359/385 |
| 6,088,155 A | * | 7/2000 | Tandler et al. .............. 359/381 |
| 6,226,118 B1 | * | 5/2001 | Koyama et al. ............ 359/380 |
| 6,337,767 B1 | * | 1/2002 | Takeuchi ..................... 359/388 |
| 6,347,009 B1 | * | 2/2002 | Takeuchi ..................... 359/385 |
| 6,366,398 B1 | * | 4/2002 | Ouchi ......................... 359/381 |

FOREIGN PATENT DOCUMENTS

DE    199 31 949 A1    1/2001

* cited by examiner

Primary Examiner—Thong Nguyen
(74) Attorney, Agent, or Firm—Simpson & Simpson, PLLC

(57) ABSTRACT

The invention concerns a microscope with a capability for switching between the deep ultra-violet and the visible spectral region having a displaceable tube lens changer (16) with at least one tube lens (17a) for the IV light region and at least one tube lens (17b) for the visible light region and additionally having a reflector carrier having multiple reflectors (12) arranged shiftably in the illuminating beam path on said reflector carrier (13). The reflector carrier (13) on the one hand and the tube lens changer (16) on the other hand are mechanically coupled to one another in such a way that shifting the reflector carrier (13) in the illuminating beam path to a specific reflector (12) automatically displaces the tube lens changer (16) in such a way that the latter arranges in the optical axis (15) a tube lens (17) corresponding to the reflector (12).

10 Claims, 5 Drawing Sheets

MICROSCOPE

CROSS REFERENCE TO RELATED APPLICATIONS

This invention claims priority of the German patent application 100 61 627.542 filed Dec. 11, 2000 and of the German patent application DE 101 54 240.2 filed Nov. 7, 2001 which are incorporated by reference herein.

FIELD OF THE INVENTION

The invention concerns a microscope with a capability for switching between the deep ultra-violet and the visible spectral region, having a displaceable tube lens changer with at least one tube lens for the deep ultra-violet spectral region and at least one tube lens for the visible spectral region.

BACKGROUND OF THE INVENTION

The resolution of a microscope depends substantially on the wavelength of the illumination light used. Conventional microscopes are operated with light in the visible wavelength region (abbreviated "VIS"). In order to resolve extremely small structures, for example on wafers or circuits in the semiconductor industry, imaging at shorter wavelengths in the deep ultra-violet of the light spectrum (abbreviated "DUV") is required. The microscope image is made visible using a TV camera that is sensitive to the DUV light.

The materials in conventional VIS optics which are suitable for the VIS spectral region are not transparent to DUV. DUV operation of the microscope therefore requires optics constructed from special materials, for example prisms, beam splitters, and tube lenses, as well as objectives that are corrected for DUV wavelengths. In order to meet future requirements of the semiconductor industry, a DUV microscope preferably has capabilities for switching between VIS and DUV optics and the respective associated illumination systems, in which a switchover between VIS and DUV objectives is also made.

Nowadays, the objectives of most manufacturers, which have a high correction rate of all image errors, are calculated for an infinity beam, and together with a tube lens constitute a compensation system. This means, by correction of the image errors a first portion of the image errors is corrected in the objective and the remaining portion of the image errors is corrected in the tube lens. Accordingly, it is not essential that a tube lens consists of a single lens, as the term lets presume, but can consist of lens groups or a tube lens system. Therefore, for different objectives which are calculated for different spectral regions, the relevant compensating tube lens has to be inserted into the beam path for the related objective and the related spectral region. Such a compensating system consisting of an objective and a tube lens is, for example, described in German patent application DE 199 31 949 A1.

In a microscope with a capability for switching between the deep ultra-violet and the visible spectral region, the compensation must be made for the chosen spectral region. Therefore, a switch-over to the chosen spectral region requires that the tube lens changer is also changed to the corresponding tube lens.

In known microscopes that are designed for working in both the UV and the visible light region, different reflectors and filters which are assigned for different microscopy and contrast methods—for example bright-field, dark-field, interference contrast, and DUV methods—are arranged shiftably in the illuminating beam path and mounted on a reflector carrier. Displacement can be accomplished by hand or preferably by a motorized drive system.

Depending on the adjustment of the microscope, a tube lens has not only to be attached to a certain objective, but additionally to a certain reflector or filter. In the known microscopes, the displacement of the tube lens changer is accomplished by way of a separate motorized drive system for the tube lens changer. The association between the motorized shiftable reflectors on the one hand and a corresponding tube lens on the other hand is accomplished by software.

Disadvantages of this known displacement and association of the tube lens changer and tube lens are on the one hand the complex and space-intensive use of a motorized drive system for the tube lens changer, and on the other hand the circumstance that a program fault or program failure can result in an incorrect association between reflector and tube lens when working in the UV light region.

SUMMARY OF THE INVENTION

It is therefore an object of the invention to create a microscope with a simple and safe capability for switching between the deep ultra-violet and the visible spectral region.

This object is achieved, according to the present invention, in that the reflector carrier on the one hand and the tube lens changer on the other hand are mechanically coupled to one another in such a way that shifting the reflector carrier in the illuminating beam path to a specific reflector automatically displaces the tube lens changer in such a way that the latter arranges in the optical axis a tube lens corresponding to the reflector.

As a result of the mechanical positive coupling according to the present invention between the motion of the reflector carrier and that of the tube lens changer, a separate drive system for the tube lens changer can be dispensed with. The mechanical coupling of the two assemblies is moreover designed in such a way that, for example, a UV tube lens is automatically associated with the DUV reflector with no need for a separate and thus also fault-susceptible software-based or similar association of the assemblies with one another.

According to a practical embodiment of the invention, it is proposed that the positive coupling between reflector carrier and tube lens changer be accomplished via at least one driver pin which is configured as a pin, retained on the reflector carrier, that engages into a corresponding receptacle of the tube lens changer and positively drives the latter upon displacement of the reflector carrier.

The tube lens changer is advantageously configured in space-saving fashion as a rotatably mounted disk whose rotation angle for shifting the tube lens into the optical axis can be limited by way of adjustable stops.

In order to hold the tube lens changer and thus the tube lenses in accurately positioned fashion in the end positions of the rotation angle, it is further proposed that in the end positions, the tube lens changer be spring-loaded in the direction of the stops.

For configuration of the reflector carrier, the invention proposes that the latter be configured as a linear slider, since such a slider can be moved in reliable and accurately positioned fashion along a linear guide. This is of even greater importance in the present case because, as a result of the positive coupling, the motion of the reflector carrier directly brings about the displacement of the tube lens changer.

Lastly, the invention proposes that the linear slider be drivable in motorized fashion.

BRIEF DESCRIPTION OF THE DRAWINGS

Further features and advantages of the invention are evident from the description below of the pertinent drawings, in which two exemplary embodiments of a microscope according to the present invention are schematically depicted merely by way of example. In the drawings.

DETAILED DESCRIPTION OF THE INVENTION

Figure 1:
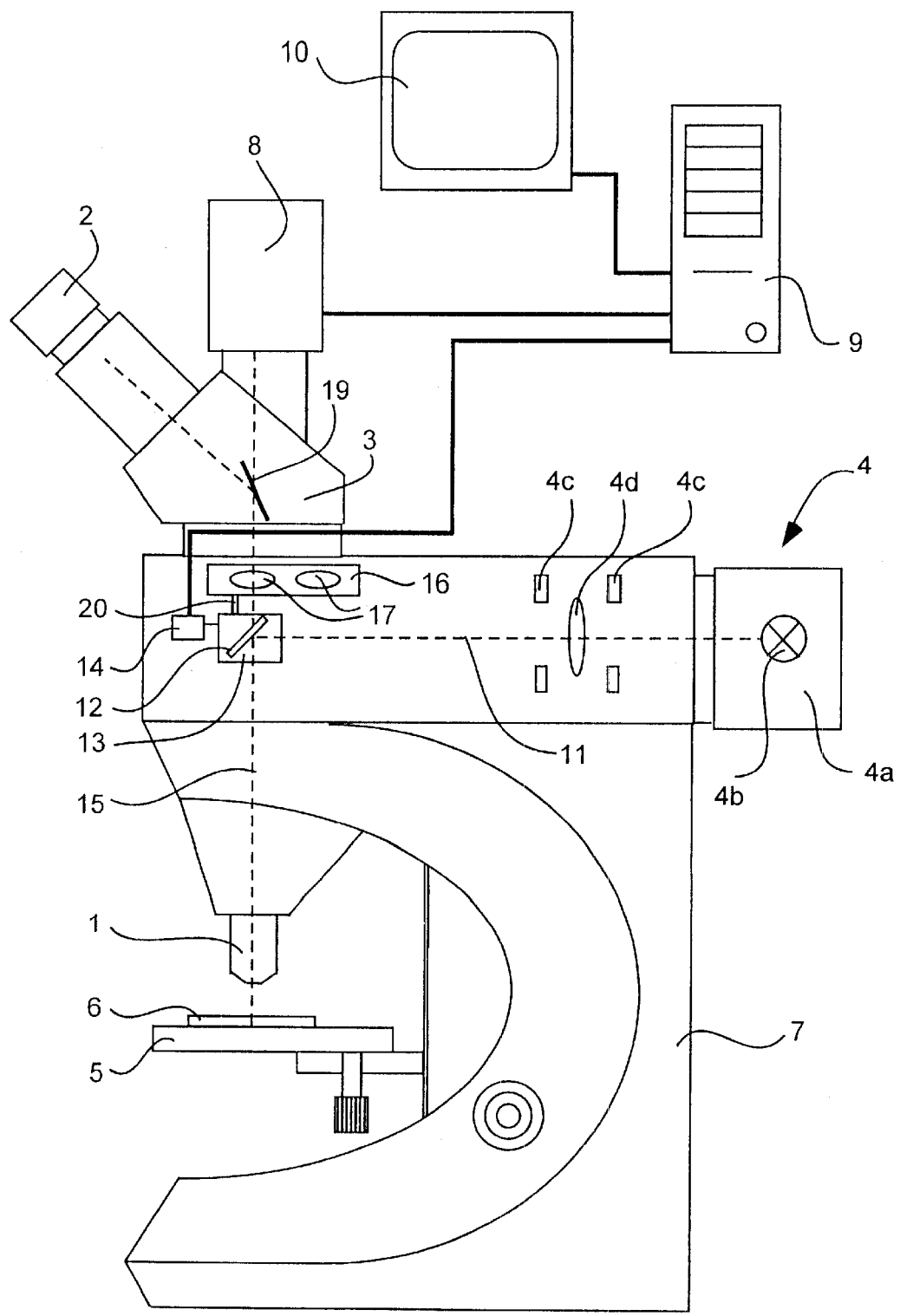
FIG. 1 schematically depicts, in partial section, the construction of a microscope.

FIG. 1 schematically depicts the construction of a microscope, in this case a reflected-light microscope. The microscope depicted substantially comprises two optical systems, an objective 1 and an eyepiece 2, that are joined to one another by a tube 3; an illumination device 4; a specimen stage 5 for receiving a specimen 6 to be examined; and a stand 7 for retaining the optical parts.

For observation and display and for storage and processing, the microscope depicted is furthermore equipped with a camera 8 and with a computer 9 with monitor 10.

Illumination device 4 of this reflected-light microscope comprises a light source 4b, arranged in a lamp housing 4a, whose light is directed along optical axis 11 of illuminating beam path, through an illumination optical system 4c and stops 4d, to a reflector 12, and deflected from the latter onto specimen 6 arranged on specimen stage 5. Reflector 12 that deflects the light beam of the illuminating beam path is arranged on a reflector carrier 13, configured as a linear slider, that carries multiple reflectors respectively filters 12 which can be displaced into the optical axis depending on the contrast method that is selected. In the case depicted, reflector carrier 13 is displaceable in motorized fashion via a drive system 14.

Arranged in optical axis 15 of the viewing beam path, above reflector carrier 13, is a tube lens changer 16 with which, as a function of the contrast method and thus the reflector 12 selected, a corresponding tube lens 17 can be pivoted into optical axis 15. As is evident from FIGS. 2 through 5, tube lens changer 16 is configured as a disk that is pivotable about a rotation point 18.

For viewing specimen 6 arranged on specimen stage 5 through eyepiece 2, or for imaging by means of camera 8, a beam splitter 19 is also arranged in optical axis 15 of the viewing beam path. The association of a specific tube lens 17 with a specific contrast method and thus reflector 12 is made in such a way that according to the chosen spectral region (VIS or DUV), a suitable objective is chosen and a tube lens relating to the compensation system is attached to the objective. For this purpose, the microscope depicted is designed in such a way that when DUV reflector 12 is arranged by means of reflector carrier 13 in the illuminating beam path, tube lens changer 16 is automatically actuated in such a way that a UV tube lens 17 is arranged in optical axis 15 of the viewing beam path.

In the embodiment depicted, reflector carrier 13 on the one hand and tube lens changer 16 on the other hand are mechanically positively coupled to one another by way of a driver pin 20. The exact configuration of reflector carrier 13 that is embodied as a linear slider, and of tube lens changer 16, is evident from FIGS. 2 through 5.

Figure 2:
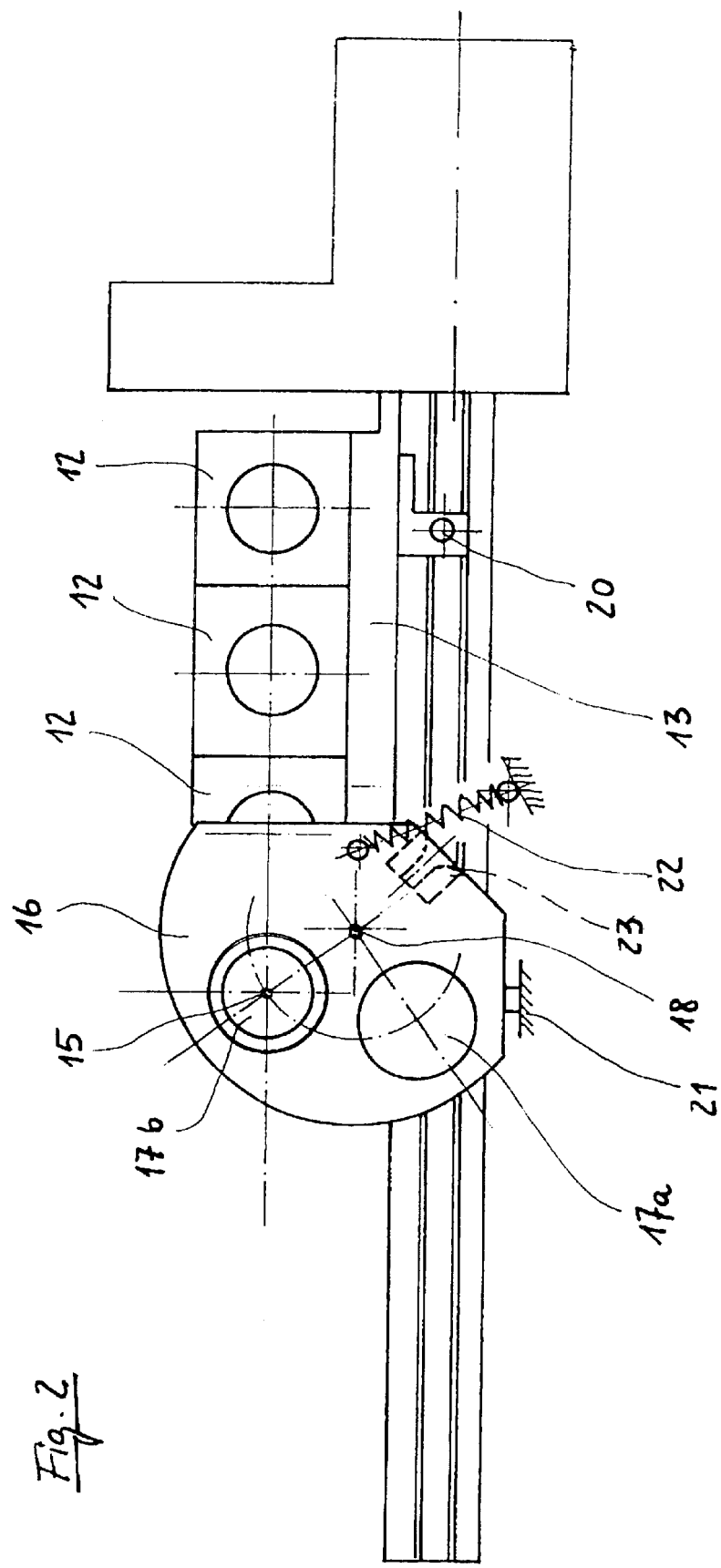
FIG. 2 shows a schematic plan view of a tube lens changer and a reflector carrier according to the invention, depicting the tube lens changer in a first end position.
Figure 3:
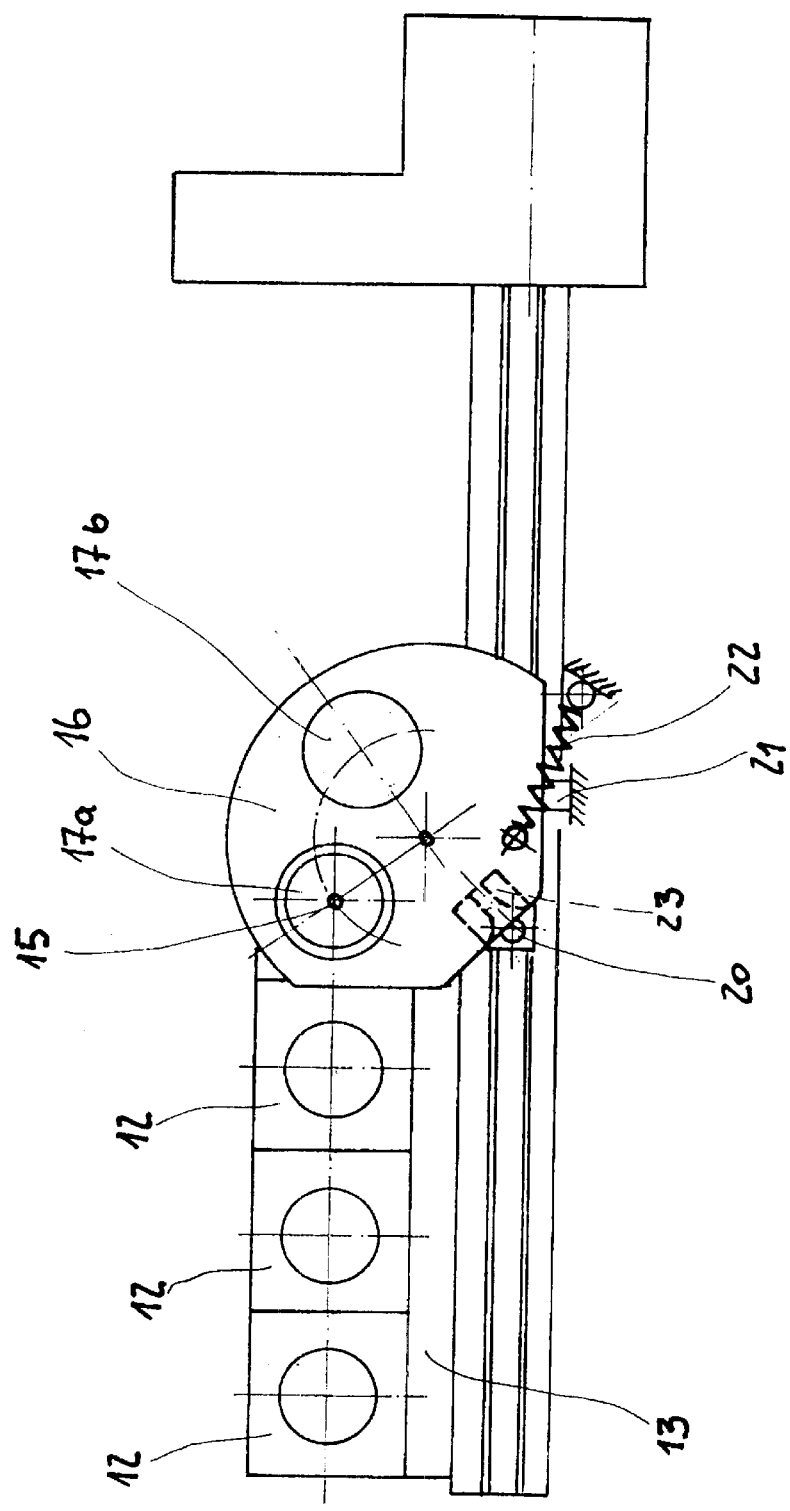
FIG. 3 shows a view corresponding to FIG. 2, but depicting the tube lens changer in a second end position.
Figure 4:
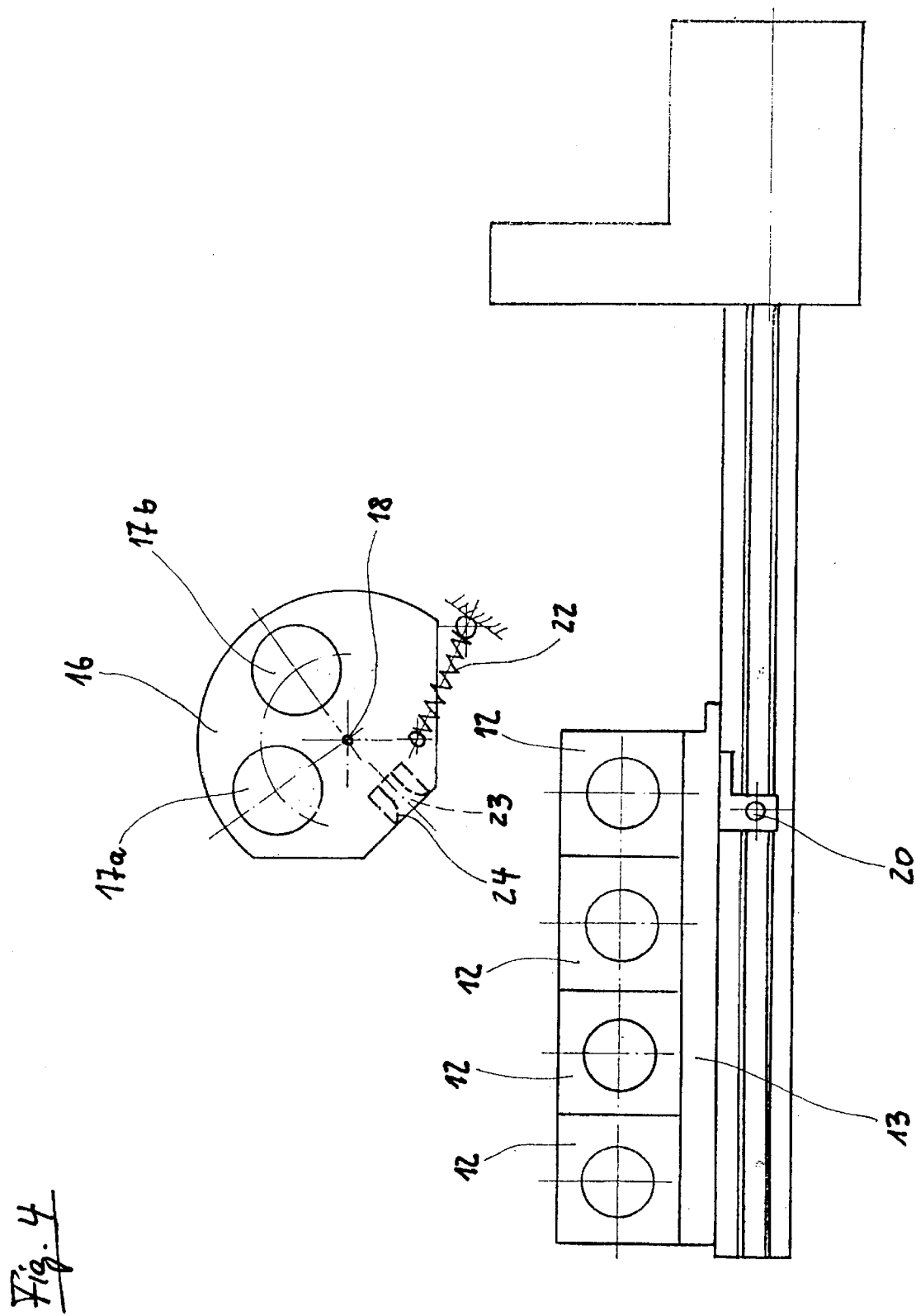
FIG. 4 shows a view corresponding to FIG. 3, but depicting the tube lens changer and the reflector carrier next to one another.

FIGS. 2, 3, and 4 show a reflector carrier 13 having three reflectors 12 arranged thereon; in the case depicted, reflector 12 arranged at the far right is a DUV reflector 12. Tube lens changer 16, which as shown in FIGS. 2 through 4 is equipped with two tube lenses 17—i.e., a DUV tube lens 17a for the DUV spectral region and a VIS tube lens 17b for the visible VIS light region—is arranged in the viewing beam path above reflector carrier 13. It is a particularly advantageous embodiment because the DUV tube lens 17a is calculated and designed in such a way that it constitutes a compensation system together with different DUV objectives and can be used for all operations in the DUV mode. Likewise, the VIS tube lens 17b is calculated and designed in such a way that it constitutes a compensation system together with different VIS objectives and can be used for all operations in the VIS mode. Depending on how the respective compensation system is calculated, different VIS tube lenses can be attached to different VIS objectives and also different DUV tube lenses can be attached to different DUV objectives (not shown).

Tube lens changer 16 is pivotable about rotation point 18 between the end positions depicted in FIGS. 2 and 3, the rotation angle being limited in the end positions by stops 21. To ensure that in the end position of tube lens changer 16, the respective tube lens 17 is also arranged accurately in optical axis 15, stops 21 are configured adjustably. Tube lens changer 16 moreover comprises a spring 22 that preloads the tube lens changer in the end positions against the respective stop 21, in order to hold the respective tube lens 17 securely in the correct position in optical axis 15.

Driver pin 20, schematically depicted in FIG. 1 and effecting the mechanically positive coupling between reflector carrier 13 on the one hand and tube lens changer 16 on the other hand, is mounted on reflector carrier 13 at the level of DUV reflector 12. As is apparent from FIGS. 2 and 3, driver pin 20 engages into a receptacle 23 configured in tube lens changer 16 upon movement of reflector carrier 13 from the position depicted in FIG. 2 into the position depicted in FIG. 3. The entry of driver pin 20 into receptacle 23, and the further movement of reflector carrier 13, cause tube lens changer 16 to be positively pivoted by driver pin 20 about rotation point 18 until, when DUV reflector 12 is arranged in optical axis 15, DUV tube lens 17a is also arranged in optical axis 15, as FIGS. 3 and 4 show. Entry of driver pin 20 into receptacle 23 is facilitated by the fact that receptacle 23 is equipped with insertion bevels 24 on both sides in the vicinity of its opening. Each tube lens 17 can be configured as a lens system assembled from multiple lens elements.

Figure 5:
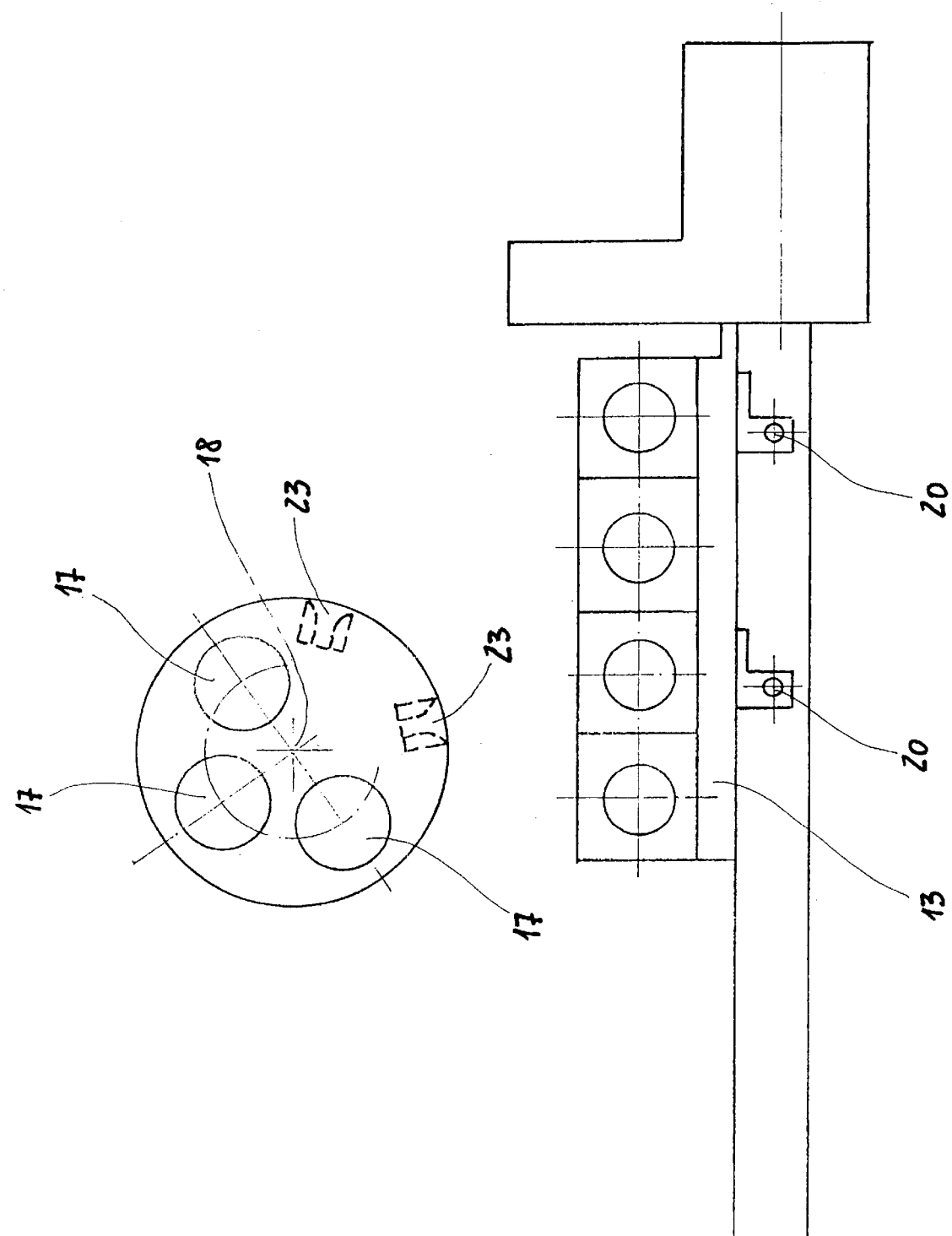
FIG. 5 shows a schematic view of a second embodiment according to the present invention of the tube lens changer and reflector carrier.

Lastly, FIG. 5 shows an alternative embodiment of reflector carrier 13 and tube lens changer 16. In this embodiment, tube lens changer 16 is fitted with three tube lenses 17. Reflector carrier 13 correspondingly comprises two driver pins 20 that each can enter into a corresponding receptacle 23 of tube lens changer 16 in order to shift tube lens changer 16 to the tube lens 17 corresponding to the respective reflector 12.

The mechanical positive coupling between reflector carrier 13 and tube lens changer 16 ensures that for each reflector 12, the correct respective tube lens 17 is also automatically arranged in the viewing beam path. The mechanical positive coupling moreover makes it possible to dispense with a separate drive system for tube lens changer 16, since it is pivoted in positively guided fashion via driver pin 20.

The invention has been described in detail with particular reference to certain preferred embodiments thereof, but it will be understood that variations and modifications can be effected within the spirit and scope of the invention.

PARTS LIST

1 Objective
2 Eyepiece
3 Tube
4 Illumination device
4a Lamp housing
4b Light source
4c Stop
4d Illumination optical system
5 Specimen stage
6 Specimen
7 Stand
8 Camera
9 Computer
10 Monitor
11 Optical axis
12 Reflector
13 Reflector carrier
14 Drive system
15 Optical axis
16 Tube lens changer
17 Tube lens
17a DUV tube lens
17b VIS tube lens
18 Rotation point
19 Beam splitter
20 Driver pin
21 Stop
22 Spring
23 Receptacle
24 Insertion bevel

What is claimed is:

1. A microscope with a capability for switching between the deep ultra-violet and the visible spectral region comprising:

a displaceable tube lens changer (16) with at least one tube lens (17a) for the UV light region and at least one tube lens (17b) for the visible light region, and a reflector carrier (13) having multiple reflectors (12) arranged shiftably in the illuminating beam path, wherein during a switch-over to a chosen spectral region a reflector (12) corresponding to the chosen spectral region is inserted into the illuminating beam path by shifting the reflector carrier (13), whereby the tube lens changer (16) is operatively arranged to insert a tube lens (17) corresponding to the chosen spectral region into an optical axis (15).

2. The microscope as defined in claim 1, wherein the reflector carrier (13) and the tube lens changer (16) are operatively arranged to be mechanically coupled to one another, said coupling shifting the reflector carrier (13) in the illuminating beam path to a specific reflector (12) and displacing the tube lens changer (16), said displacement inserting said tube lens corresponding to the chosen spectral region into said optical axis (15).

3. The microscope as defined in claim 2, wherein the reflector carrier (13) and the tube lens changer (16) are positively coupled to one another via at least one driver pin (20).

4. The microscope as defined in claim 3, wherein each driver pin (20) is configured as a pin, retained on the reflector carrier (13), that engages into a corresponding receptacle (23) in the tube lens changer (16).

5. The microscope as defined in claim 4, wherein the tube lens changer (16) is configured as a rotatably mounted disk.

6. The microscope as defined in claim 5, wherein the reflector carrier (13) is configured as a linear slider.

7. The microscope as defined in claim 6, wherein the reflector carrier (13) configured as a linear slider is drivable in motorized fashion.

8. The microscope as defined in claim 2, wherein the tube lens changer (16) is configured as a rotatably mounted disk.

9. The microscope as defined in claim 8, wherein a rotation angle of the tube lens changer (16) can be limited by way of adjustable stops (21).

10. The microscope as defined in claim 9, wherein in its end positions, the tube lens changer (16) is spring-loaded to engage with the stops (21).

* * * * *